UNITED STATES PATENT OFFICE.

ANSON GARDNER BETTS, OF TROY, NEW YORK.

METALLURGICAL PROCESS.

No. 905,280.

Specification of Letters Patent.

Patented Dec. 1, 1908.

Application filed February 19, 1908. Serial No. 416,706.

*To all whom it may concern:*

Be it known that I, ANSON GARDNER BETTS, a citizen of the United States, residing at Troy, in the county of Rensselaer and State of New York, have invented certain new and useful Improvements in Metallurgical Processes, of which the following is a specification.

This invention relates to the recovery of metals, especially zinc, iron and manganese, from ores and slags.

The amount of iron and zinc, and to some extent that of manganese, left in slags from copper and lead smelting, and some other smelting operations, is very important, and no method is in use as far as I am aware, of recovering the metals therefrom. Also the recovery of zinc from the ores themselves, and of iron from many copper ores for instance, has been in many cases very difficult or commercially impossible. Generally the ores of zinc contain other valuable metals, lead and copper for instance, and frequently these are separated at some cost and with much metal loss, before smelting.

Some objects of my invention are to recover especially zinc and iron from ores, and that now lost in slags, in an efficient manner, and to provide a method of smelting which makes unnecessary in many cases the preliminary mechanical separation of zinc ores from lead and copper ores naturally mixed therewith. These objects are achieved by smelting the ores in substantially the usual manner in blast or reverberatory furnaces, and recovering the zinc, iron and manganese from the slags, and in case old slags are being treated, the slags are first melted down in a suitable furnace like ore, or mixed with ore.

I achieve the recovery of the zinc, iron and manganese, etc., one, two or all, by the addition to the slag, preferably in its molten condition as it flows from the ore- or slag- melting furnace, of silicon or a silicid, ferro-silicon containing sufficient iron to materially increase the specific gravity, being suitable.

The slag usually runs from lead or copper furnaces, etc., in a steady stream, which may be diverted in my method into a suitable furnace or forehearth, which may be provided with a taphole for iron, an overflow for the treated slag, and if zinc is present, with a condenser for the distilled zinc. Silicon or a silicon alloy (silicid) may be added also practically continuously.

A great deal of heat is liberated by the reactions $$2FeO + Si = 2Fe + SiO_2$$
$$2ZnO + Si = 2Zn + SiO_2$$

and iron separates at the bottom of the forehearth, while zinc boils off. If the slag contains manganese, most of it is found in the iron, if sufficient silicon is used.

In order to produce a relatively fusible iron, an excess of silicon should be used, so that the iron will contain several per cent. of silicon. The resulting slag, deprived wholly or in part of the oxids or iron, manganese and zinc, and with an increased amount of silica, is usually much less fusible, but the increased temperature from the heat of the reaction, gives a sufficiently fluid product, especially since the larger the quantity of the basic iron, manganese and zinc oxids reduced and removed, and of silicon oxidized and taken into the slag, the greater is the liberation of heat, and consequently the greater is the increase in temperature.

I prefer to use the process continuously, so that the melted slag from the smelting furnace runs through a covered forehearth or forehearths of suitable dimensions, while silicon or material containing silicon or a silicid is continually added in the correct proportion. The accumulating iron and manganese may be tapped off at intervals, while zinc condenses in the condenser and is collected outside the furnace.

To recover zinc from zinc ores I may either add the ore, roasted if necessary, to a copper, lead or other smelting furnace, collecting the zinc from the slag as above described, or I may melt the zinc ore with a suitable slag or flux, if such is required, and reduce and remove the zinc by silicon or a silicid, returning, if desired, part or all of the resulting slag or cinder to the process as a flux for more zinc ore.

Since one pound of silicon reduces about four pounds of iron, or four and one-half pounds of zinc, it will be seen that frequently the silicon or silicid necessary can be manufactured at a distance from the smelting site, and transported thither at a relatively small cost per ton of iron or zinc.

My process has an important advantage over other metallurgical processes having the same aim, in that it is applicable to relatively low-grade materials, and the necessary energy can be supplied by the cheap combustion of fuel up to a certain temperature, and when the efficiency of energy supply by this means becomes low, at say the melting point of ordinary slags, a more expensive but more efficient and convenient supply of energy is only then added, in the shape of silicon.

Most or all other metallurgical processes use either the energy of burning fuel, which is very inefficient or totally inefficient for many purposes, while the other class uses more expensive forms of energy, as electric energy, which use is wasteful up to say the melting point of slags, as this can be performed more conveniently and cheaply by burning fuel.

In the smelting of zinc ores (as in any distillation) it is desirable to have the charge at somewhere near the same temperature throughout the mass, as otherwise entirely different materials may be distilling from various parts of the charge, producing an impure or faulty product. By my method I insure the absence of many disturbing materials in the zinc vapor with great advantage. Also my process, as applied to zinc, is peculiarly desirable in that the iron and zinc do not interfere with the recovery of each other.

By the term silicon in the claims, I mean to include materials containing unoxidized silicon, as alloys thereof, and silicids.

What I claim as new and desire to secure by Letters Patent, is—

1. The process of recovering metals separately which consists in reducing them, from their oxids contained in a slag, by the action of silicon thereon.

2. The process of recovering a metal from a slag which consists in reacting on the slag in a molten condition, with a reduction-product of silica.

3. The process of recovering metal which consists in producing a slag containing metal as oxid or oxids by the agency of burning fuel, and reducing metal from the fused slag by adding silicon or a silicon alloy thereto.

4. The process of recovering a metal or metals which consists in smelting ores by the agency of fuel, and separating metal contained in the slag produced by reacting thereon with silicon.

5. The process of recovering a metal or metals including zinc, which consists in reacting on a material containing oxidized zinc with silicon.

6. The process of recovering metals including iron and zinc which consists in smelting ore containing zinc, and adding a material containing silicon to the resulting slag containing iron and zinc, and condensing the evolved zinc.

7. The process of recovering metals, including iron and zinc which consists in smelting ore thereof, and adding silicon or a silicid to the slag containing iron and zinc in a suitable furnace, thereby reducing and precipitating iron and reducing and vaporizing metallic zinc.

8. The process of recovering iron and zinc from slags which consists in adding to a slag containing iron and zinc oxids, silicon, and thereby reducing and precipitating iron, and reducing, volatilizing and condensing metallic zinc.

9. The process of recovering a metal or metals which consists in preparing a slag containing the oxid or oxids thereof, and reducing metal therefrom by adding silicon.

10. The process of recovering metals from ore which consists in extracting a metal therefrom by smelting with the heat of burning fuel, and recovering another metal from the resulting slag by the action of silicon thereon.

11. The process of recovering metals which consists in extracting a metal therefrom by a smelting process, and reducing another metal from the slag produced, by reduction with silicon or material containing an important amount of silicon.

In testimony whereof I have hereunto set my hand in the presence of two subscribing witnesses.

ANSON GARDNER BETTS.

Witnesses:
WALTER B. BARNHISEL,
EDGAR K. BETTS.